US008073245B2

(12) United States Patent
Nireki

(10) Patent No.: US 8,073,245 B2
(45) Date of Patent: Dec. 6, 2011

(54) CARD IDENTIFYING APPARATUS

(75) Inventor: Takao Nireki, Tokyo (JP)

(73) Assignee: Universal Entertainment Corporation, Tokyo (JP)

(*) Notice: Subject to any disclaimer, the term of this patent is extended or adjusted under 35 U.S.C. 154(b) by 1067 days.

(21) Appl. No.: 11/863,775

(22) Filed: Sep. 28, 2007

(65) Prior Publication Data

US 2008/0247604 A1 Oct. 9, 2008

(30) Foreign Application Priority Data

Sep. 29, 2006 (JP) ................................ 2006-266779

(51) Int. Cl.
*G06K 9/00* (2006.01)

(52) U.S. Cl. ........ 382/162; 382/100; 382/324; 382/138; 382/209; 194/207; 194/556; 194/206

(58) Field of Classification Search .................. 382/162, 382/209, 217, 138, 139, 135; 194/207, 556, 194/206; 235/379, 494
See application file for complete search history.

(56) References Cited

U.S. PATENT DOCUMENTS

| | | | | |
|---|---|---|---|---|
| 4,853,752 | A * | 8/1989 | Takahashi et al. | 355/77 |
| 5,629,990 | A * | 5/1997 | Tsuji et al. | 382/324 |
| 5,647,010 | A * | 7/1997 | Okubo et al. | 382/100 |
| 5,947,255 | A | 9/1999 | Shimada et al. | |
| 6,095,425 | A * | 8/2000 | Mowry, Jr. | 235/494 |
| 6,354,507 | B1 * | 3/2002 | Maeda et al. | 235/494 |
| 6,824,047 | B2 * | 11/2004 | Katou et al. | 235/379 |
| 7,097,022 | B2 | 8/2006 | Mukai | |
| 7,589,339 | B2 * | 9/2009 | Mukai | 250/559.11 |
| 7,721,952 | B2 * | 5/2010 | Leeper | 235/379 |
| 2001/0028726 | A1 * | 10/2001 | Miyake | 382/100 |
| 2002/0044673 | A1 * | 4/2002 | Powell et al. | 382/100 |
| 2004/0199468 | A1 | 10/2004 | Nakabayashi et al. | |
| 2005/0073472 | A1 * | 4/2005 | Kim et al. | 345/6 |
| 2005/0133339 | A1 * | 6/2005 | Mukai | 194/207 |
| 2008/0240512 | A1 | 10/2008 | Nireki | |

FOREIGN PATENT DOCUMENTS

| | | | |
|---|---|---|---|
| CN | 1530885 | A | 9/2004 |
| CN | 1653492 | A | 8/2005 |
| CN | 101159070 | A | 4/2008 |
| EP | 0 472 192 | A2 | 2/1992 |
| JP | 5-62045 | | 3/1993 |
| JP | 7-306964 | | 11/1995 |
| JP | 9-245216 | | 9/1997 |
| JP | 11-110545 | | 4/1999 |
| JP | 2001-101473 | | 4/2001 |
| JP | 2004-78620 | | 3/2004 |
| JP | 2004078620 | A * | 3/2004 |
| KR | 10-2007-0059016 | A | 6/2007 |
| KR | 10-0727491 | B1 | 6/2007 |
| WO | WO 02/50790 | A1 | 6/2002 |

* cited by examiner

OTHER PUBLICATIONS

U.S. Appl. No. 11/862,599, filed Sep. 27, 2007, Nireki.

*Primary Examiner* — Brian Q Le
*Assistant Examiner* — Mek Bekele
(74) *Attorney, Agent, or Firm* — Oblon, Spivak, McClelland, Maier & Neustadt, L.L.P.

(57) ABSTRACT

A card identifying apparatus according to one embodiment of the invention has a light-receiving portion that reads a card on a pixel basis of a predetermined area as a unit including color information having brightness, RAM that stores image data comprised of a plurality of pixels read by the light-receiving portion, a pixel data increasing/decreasing processing section that increases/decreases the number of pixels of the image data, and card identifying means for identifying authentication of the card based on the image data increased/decreased by the pixel data increasing/decreasing processing section.

7 Claims, 15 Drawing Sheets

· EXAMPLE OF INCREASING/DECREASING PIXELS OF IMAGE DATA

FIG. 9A · ORIGINAL DATA (VERTICAL DIRECTION:HORIZONTAL DIRECTION=1:1)

□ ·· ONE PIXEL

| | | | | | | | | | | | |
|---|---|---|---|---|---|---|---|---|---|---|---|
| 1 | 2 | 3 | 4 | 5 | 6 | 7 | 8 | 9 | 10 | 11 | 12 |
| 13 | 14 | 15 | 16 | 17 | 18 | 19 | 20 | 21 | 22 | 23 | 24 |
| 25 | 26 | 27 | 28 | 29 | 30 | 31 | 32 | 33 | 34 | 35 | 36 |
| 37 | 38 | 39 | 40 | 41 | 42 | 43 | 44 | 45 | 46 | 47 | 48 |
| 49 | 50 | 51 | 52 | 53 | 54 | 55 | 56 | 57 | 58 | 59 | 60 |
| 61 | 62 | 63 | 64 | 65 | 66 | 67 | 68 | 69 | 70 | 71 | 72 |

FIG. 9B · TWO TIMES IN THE HORIZONTAL DIRECTION (VERTICAL DIRECTION:HORIZONTAL DIRECTION=1:2)

| | | | | | | | | | | | | | | | | | | | | | | | |
|---|---|---|---|---|---|---|---|---|---|---|---|---|---|---|---|---|---|---|---|---|---|---|---|
| 1 | | 2 | | 3 | | 4 | | 5 | | 6 | | 7 | | 8 | | 9 | | 10 | | 11 | | 12 | |
| 13 | | 14 | | 15 | | 16 | | 17 | | 18 | | 19 | | 20 | | 21 | | 22 | | 23 | | 24 | |
| 25 | | 26 | | 27 | | 28 | | 29 | | 30 | | 31 | | 32 | | 33 | | 34 | | 35 | | 36 | |
| 37 | | 38 | | 39 | | 40 | | 41 | | 42 | | 43 | | 44 | | 45 | | 46 | | 47 | | 48 | |
| 49 | | 50 | | 51 | | 52 | | 53 | | 54 | | 55 | | 56 | | 57 | | 58 | | 59 | | 60 | |
| 61 | | 62 | | 63 | | 64 | | 65 | | 66 | | 67 | | 68 | | 69 | | 70 | | 71 | | 72 | |

FIG. 9C

| | | | | | | | | | | | | | | | | | | | | | | | |
|---|---|---|---|---|---|---|---|---|---|---|---|---|---|---|---|---|---|---|---|---|---|---|---|
| 1 | 1 | 2 | 2 | 3 | 3 | 4 | 4 | 5 | 5 | 6 | 6 | 7 | 7 | 8 | 8 | 9 | 9 | 10 | 10 | 11 | 11 | 12 | 12 |
| 13 | 13 | 14 | 14 | 15 | 15 | 16 | 16 | 17 | 17 | 18 | 18 | 19 | 19 | 20 | 20 | 21 | 21 | 22 | 22 | 23 | 23 | 24 | 24 |
| 25 | 25 | 26 | 26 | 27 | 27 | 28 | 28 | 29 | 29 | 30 | 30 | 31 | 31 | 32 | 32 | 33 | 33 | 34 | 34 | 35 | 35 | 36 | 36 |
| 37 | 37 | 38 | 38 | 39 | 39 | 40 | 40 | 41 | 41 | 42 | 42 | 43 | 43 | 44 | 44 | 45 | 45 | 46 | 46 | 47 | 47 | 48 | 48 |
| 49 | 49 | 50 | 50 | 51 | 51 | 52 | 52 | 53 | 53 | 54 | 54 | 55 | 55 | 56 | 56 | 57 | 57 | 58 | 58 | 59 | 59 | 60 | 60 |
| 61 | 61 | 62 | 62 | 63 | 63 | 64 | 64 | 65 | 65 | 66 | 66 | 67 | 67 | 68 | 68 | 69 | 69 | 70 | 70 | 71 | 71 | 72 | 72 |

FIG. 9D · 0.25 TIME IN THE HORIZONTAL DIRECTION (VERTICAL DIRECTION:HORIZONTAL DIRECTION=1:0.25)
※REDUCTION BY THE METHOD OF THINNING PIXELS IN THE HORIZONTAL DIRECTION

| | | | | | | | | | | | |
|---|---|---|---|---|---|---|---|---|---|---|---|
| 1 | | | | 5 | | | | 9 | | | |
| 13 | | | | 17 | | | | 21 | | | |
| 25 | | | | 29 | | | | 33 | | | |
| 37 | | | | 41 | | | | 45 | | | |
| 49 | | | | 53 | | | | 57 | | | |
| 61 | | | | 65 | | | | 69 | | | |

FIG. 9E

| | | |
|---|---|---|
| 1 | 5 | 9 |
| 13 | 17 | 21 |
| 25 | 29 | 33 |
| 37 | 41 | 45 |
| 49 | 53 | 57 |
| 61 | 65 | 69 |

VERTICAL DIRECTION : 100%
HORIZONTAL DIRECTION : 200%

VERTICAL DIRECTION : 100%
HORIZONTAL DIRECTION : 25%

CARD IDENTIFYING APPARATUS

The present disclosure relates to subject matter contained in Japan Patent Application No. 2006-266779 filed on Sep. 29, 2006, which is expressly incorporated herein by reference in its entireties.

BACKGROUND OF THE INVENTION

The present invention relates to a card identifying apparatus that identifies the validity of cards such as, for example, bills, coupons, gift certificates and the like having the exchange value (economic value) for various kinds of products and service.

Generally, the cards such as bills, coupons, gift certificates and like are provided with various anti-counterfeit measures to prevent forgery. For example, as one of such anti-counterfeit measures, it is carried out providing a microprint (extremely fine characters, pattern and the like), reading the information of this microfilm to compare with genuine data, and thereby identifying (authentication judgment) the validity. In other words, such a microprint has fine line widths, and thereby is known to exhibit a specific pattern (moire fringes; moire pattern) by interference of light, and it is carried out obtaining the moire fringes (moire pattern) to compare with authorized data, and thereby identifying the validity of the card.

For example, Japanese Laid-Open Patent Publication No. 2004-78620 discloses techniques for forming a hidden pattern comprised of a parallel line tint in an information storage member as the card, and irradiating the hidden pattern using a light source, while detecting the reflected light via a confirmation pattern (a parallel line pattern for confirmation is formed) by a photosensor. In this case, the photosensor is capable of sensing a specific moire pattern by interference of the parallel light tint of the hidden pattern and the parallel light tint of the confirmation pattern, and an authentication judgment on the card is made by comparing the moire pattern with a standard pattern.

Further, Japanese Laid-Open Patent Publication No. H07-306964 discloses techniques for applying light to a card with a microprint using a stroboscopic lighting apparatus, and detecting the reflected light in image detecting means (area sensor) via moire fringe generating means (grid plate) for generating moire fringes. More specifically, moire fringes occur by the reflected light from the microprint passing through the grid plate, are detected by the area sensor that is the image detecting means, and judged to be good when the intensity of the frequency component fm exceeds beforehand set threshold Th, while being judged to be not good when the frequency component fm does not exceed the threshold.

In the card identifying apparatus provided with the above-mentioned authentication judgment techniques, to improve the authentication judgment accuracy, there is a case of using a sensor with a higher resolution than that of the currently used sensor. In such a case, in the techniques as described in Patent Documents 1 and 2, the need arises for surveying again a filter (grid plate) with a confirmation pattern to generate a moire pattern, and manufacturing again the filter (grid plate) corresponding to the survey, and it becomes difficult to suppress increases in the cost.

Accordingly, a card identifying apparatus is required that enables an authentication judgment to be made using a microprint formed in the card, while suppressing increases in the cost.

BRIEF SUMMARY OF THE INVENTION

To achieve the above-mentioned object, a card identifying apparatus according to the present invention comprises a reading section for reading a card on a pixel basis of a predetermined area as a unit including color information having brightness; a storage section for storing image data comprised of a plurality of pixels read by the reading section; a increasing/decreasing section for increasing/decreasing the number of pixels of the image data; and a card identifying section for identifying authentication of the card based on the image data increased/decreased by the increasing/decreasing section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 9A to 9E are views to explain an example of procedures for increasing/decreasing pixels of image data in a pixel data increasing/decreasing processing section;

DETAILED DESCRIPTION OF THE INVENTION

An embodiment of the invention will be described below with reference to accompanying drawings. In addition, this embodiment describes about a bill as an object to undergo authentication judgment processing, and an apparatus (card identifying apparatus) that handles the bill as a bill identifying apparatus.

Figure 1:
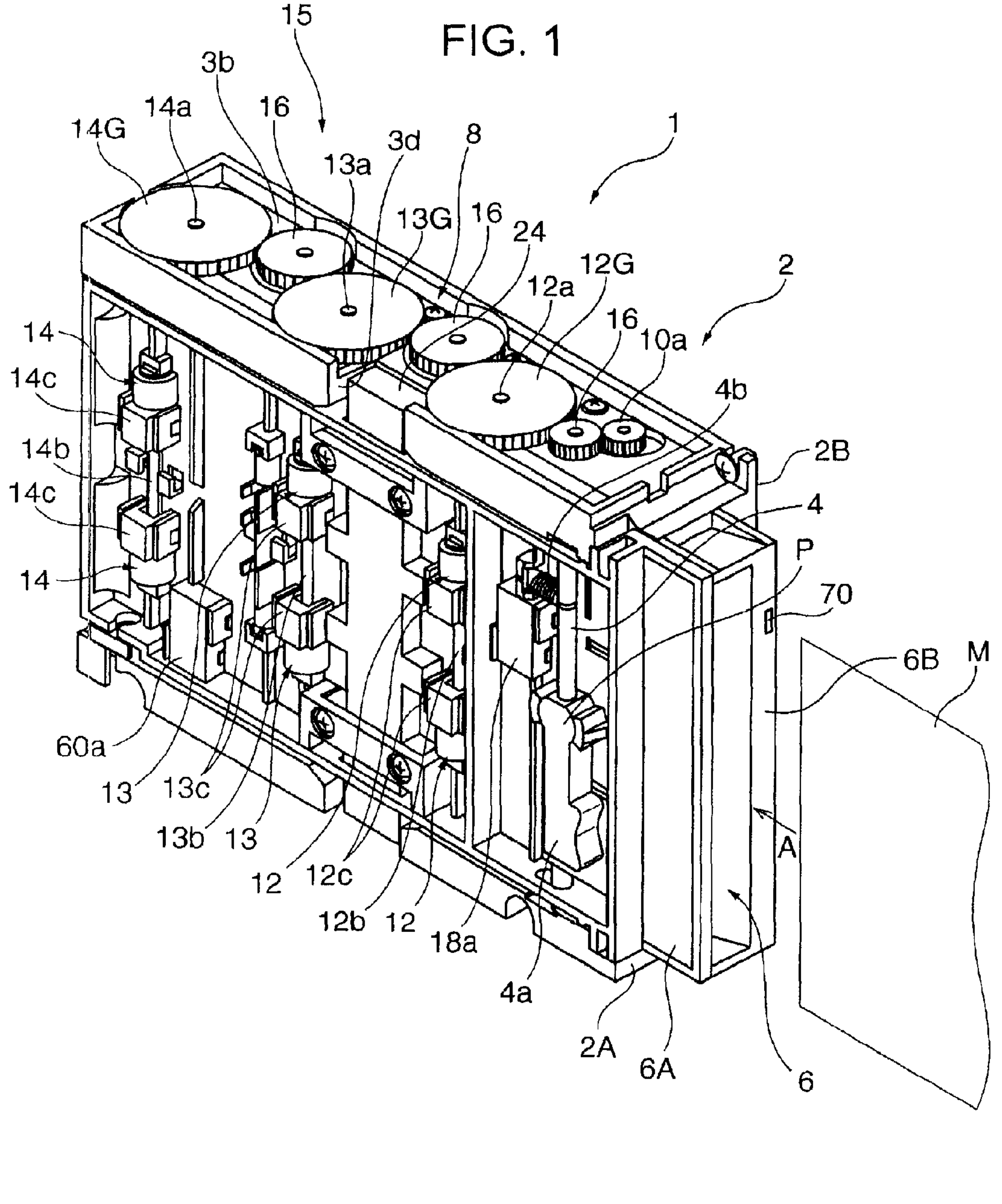
FIG. 1 is a perspective view showing an entire configuration of one embodiment of a bill identifying apparatus according to the invention.
Figure 2:
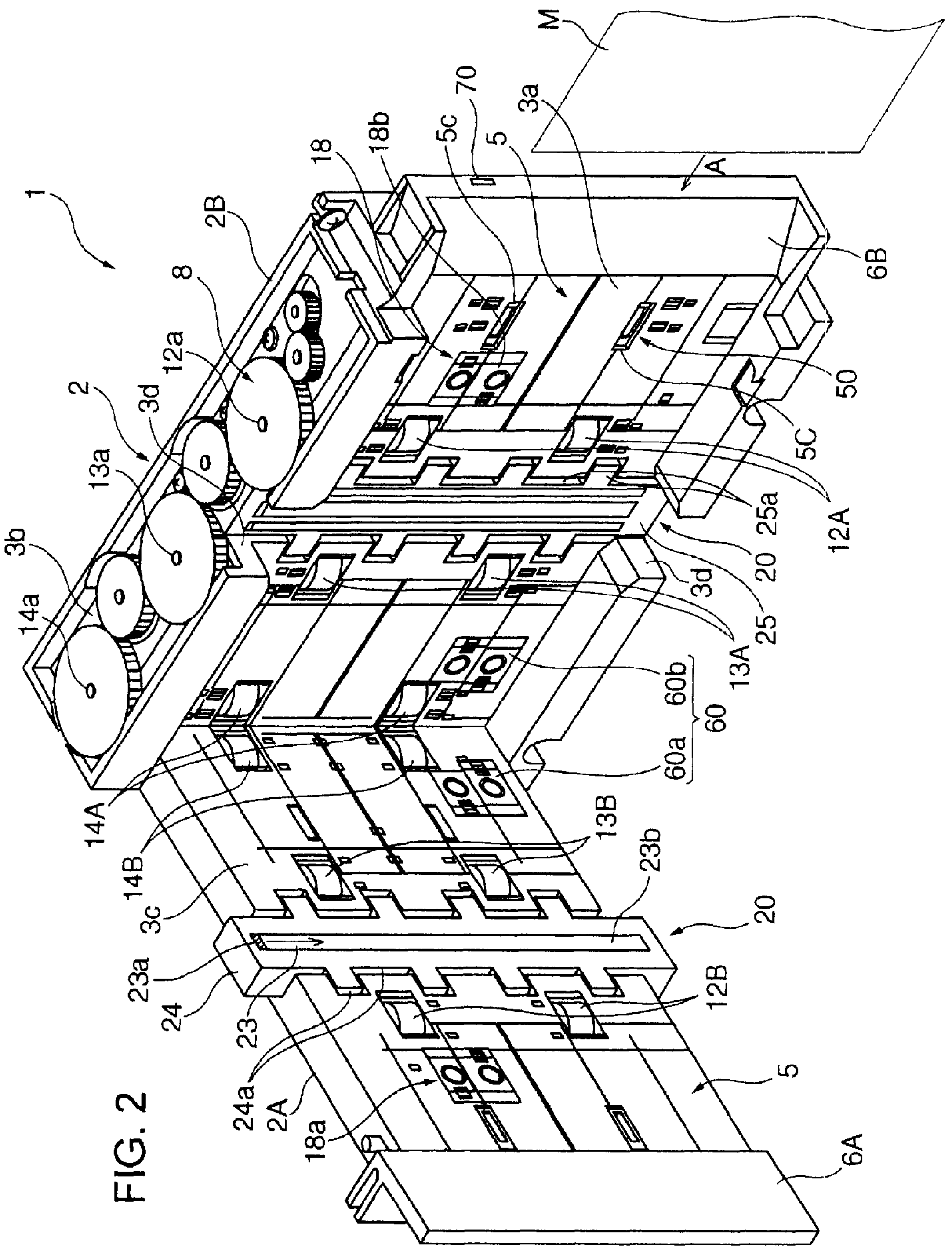
FIG. 2 is a perspective view showing a state where an upper frame is opened with respect to a lower frame.
Figure 3:
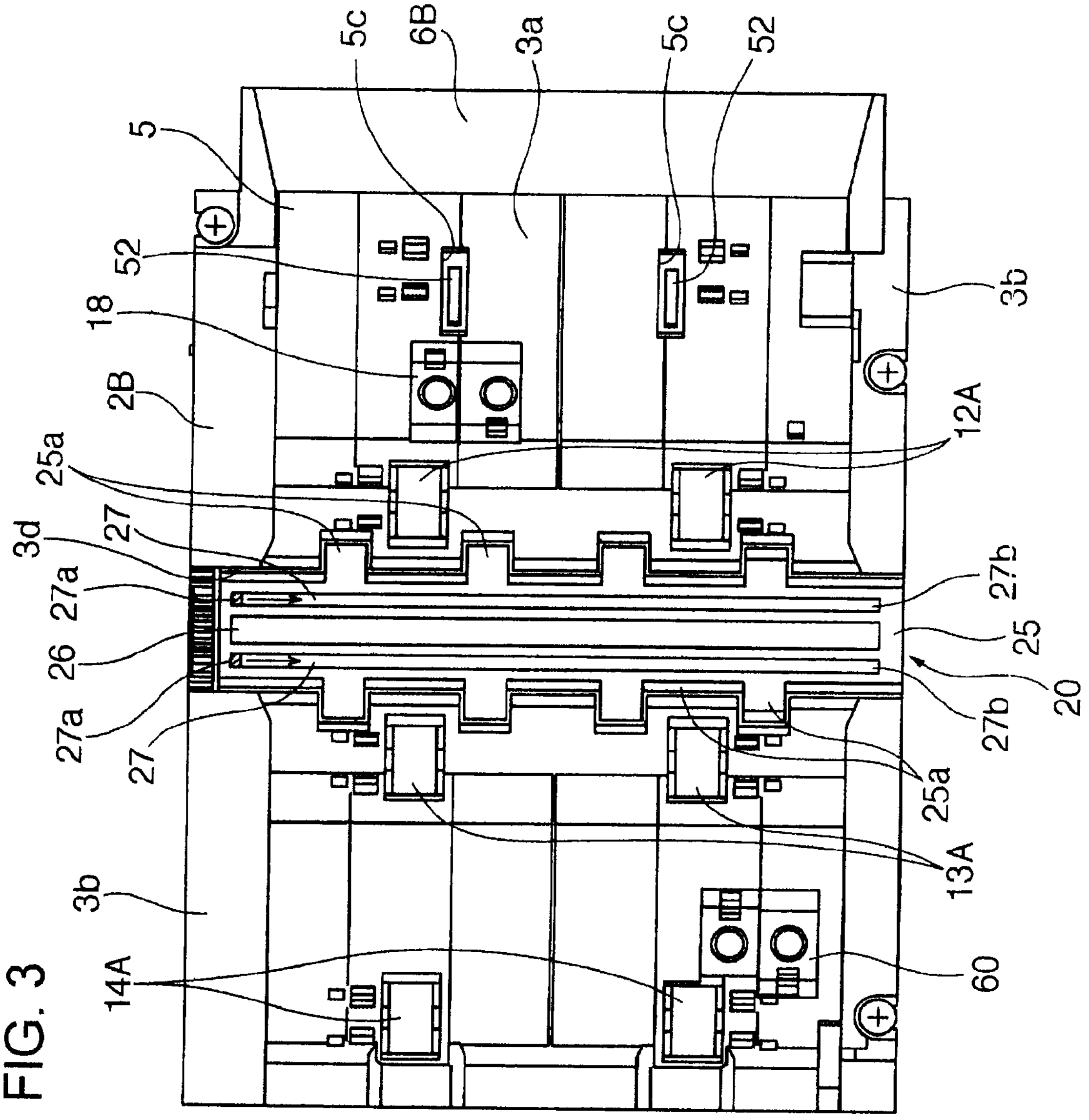
FIG. 3 is a plan view showing a bill feeding path portion of the lower frame.
Figure 4:
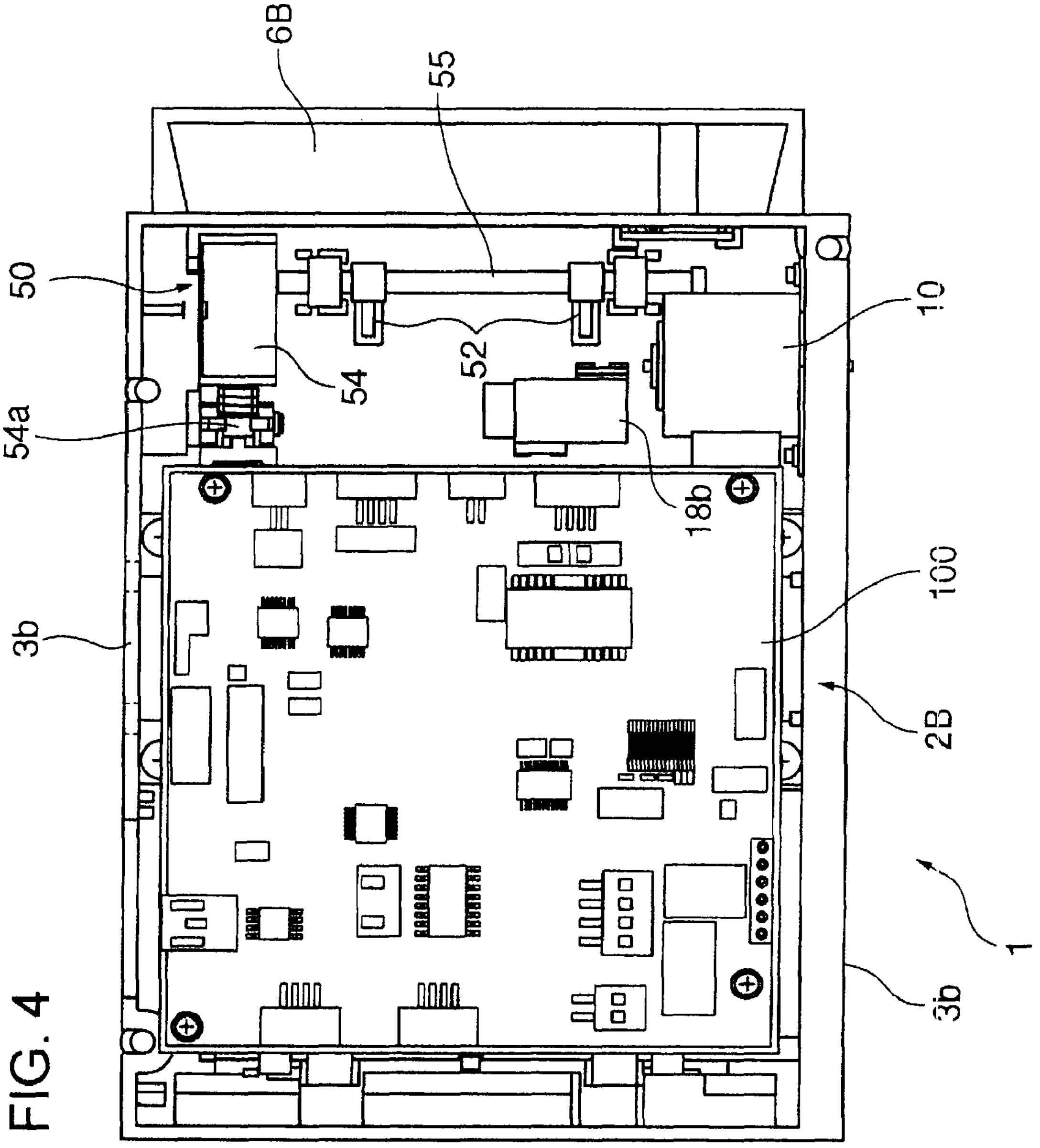
FIG. 4 is a rear elevational view of the lower frame.

FIGS. 1 to 4 are views showing a configuration of a bill identifying apparatus (card identifying apparatus) according to this embodiment, FIG. 1 is a perspective view showing an entire configuration, FIG. 2 is a perspective view showing a state where an upper frame is opened with respect to a lower frame, FIG. 3 is a plan view showing a bill feeding path portion of the lower frame, and FIG. 4 is a rear elevational view of the lower frame.

A bill identifying apparatus 1 of this embodiment is configured to be capable of being incorporated into a game media lending apparatus (not shown) installed among various kinds of game machines such as, for example, slot machines and the like. In this case, the game media lending apparatus may be provided with another apparatus (for example, a bill storage unit, coin identifying apparatus, storage media processing apparatus, power supply apparatus and the like) on the upper or lower side of the bill identifying apparatus 1, and the bill identifying apparatus 1 may be formed integrally with the other apparatus, or formed separately. Then, when a bill is inserted in such a bill identifying apparatus 1 and the validity of the inserted bill is judged, the processing corresponding to the bill value is performed such as the processing for lending game media, the processing of writing in a storage medium such as a prepaid card, or like.

The bill identifying apparatus 1 is provided with a frame 2 formed in the shape of a substantially cuboid, and the frame 2 is mounted to a locking portion of the game media lending apparatus not shown in the figure. The frame 2 has a lower frame 2B as a base side and an upper frame 2A openable/closable with respect to the lower frame 2B to cover the lower frame 2B. The frames 2A and 2B are configured to be opened and closed with a base portion as a turn center as shown in FIG. 2.

The lower frame 2B has the shape of a substantially cuboid, and is provided with a bill feeding face 3*a* for feeding a bill, and side wall portions 3*b* formed on the opposite sides of the bill feeding face 3*a*. Meanwhile, the upper frame 2A is configured in the shape of a plate provided with a bill feeding face 3*c*, and when the upper frame 2A is closed to enter between the side wall portions 3*b* on the opposite sides of the lower frame 2B, a clearance (bill feeding path) 5 to feed a bill is formed between opposite portions of the bill feeding face 3*a* and bill feeding face 3*c*.

Then, the upper frame 2A and lower frame 2B are respectively provided with bill insertion portions 6A and 6B adapted to the bill feeding path 5. These bill insertion portions 6A and 6B form a bill insertion slot 6 in the shape of a slit when the upper frame 2A and lower frame 2B are closed, and as shown in FIG. 1, a bill M is inserted inside from a shorter side of the bill along the direction of allow A.

Further, a lock shaft 4 capable of locking in the lower frame 2B is disposed on the front end side of the upper frame 2A. The lock shaft 4 is provided with an operation portion 4*a*, and by operating the operation portion 4*a* to rotate against the biasing force of a biasing spring 4*b*, rotates on a pivot P as a center to release the lock state of the upper frame 2A and lower frame 2B (the state where the frames are closed; overlapping state).

In the lower frame 2B are provided a bill feeding mechanism 8, a bill detecting sensor 18 that detects a bill inserted in the bill insertion slot 6, bill reading means (a reading section) 20 that is installed on the downstream side of the bill detecting sensor 18 and that reads information of the bill in a fed state, a shutter mechanism 50 that is installed in the bill feeding path 5 between the bill insertion slot 6 and the bill detecting sensor 18 and that is driven to block the bill insertion slot 6, and control means (control board) 100 for controlling driving of structural members such as the aforementioned bill feeding mechanism 8, bill reading means 20, shutter mechanism 50 and the like, while identifying (performing authentication judgment processing) the validity of the read bill.

The bill feeding mechanism 8 is a mechanism capable of feeding the bill inserted from the bill insertion slot 6 along the insertion direction A, while feeding back the bill in an insertion state toward the bill insertion slot 6. The bill feeding mechanism 8 is provided with a driving motor 10 that is a driving source installed on the lower frame 2B side, and feeding roller pairs 12, 13 and 14 which are driven to rotate by the driving motor 10 and disposed in the bill feeding path 5 at predetermined intervals along the bill feeding direction.

The feeding roller pair 12 is provided with driving rollers 12A disposed on the lower frame 2B side, and pinch rollers 12B disposed on the upper frame 2A side to come into contact with the driving roller 12A. These driving rollers 12A and pinch rollers 12B are installed in two respective locations at predetermined intervals along the direction perpendicular to the bill feeding direction. These driving rollers 12A and pinch rollers 12B are exposed at their parts to the bill feeding path 5.

The driving rollers 12A installed in two respective positions are fixed to a driving shaft 12*a* rotatably supported by the lower frame 2B, and the two pinch rollers 12B are rotatably supported by a spindle 12*b* supported by the upper frame 2A. In this case, a biasing member 12*c* for biasing the spindle 12*b* to the driving shaft 12*a* side is provided in the upper frame 2A, and brings the pinch rollers 12B into contact with the driving roller side 12A by predetermined pressure.

In addition, as in the roller pair 12, the feeding roller pairs 13 and 14 are respectively comprised of two driving rollers 13A, 14A fixed to driving shafts 13*a*, 14*a*, and two pinch rollers 13B, 14B rotatably supported by spindles 13*b*, 14*b*, and the pinch rollers 13B, 14B are brought into contact with the driving rollers 13A, 14A by biasing members 13*c*, 14*c*, respectively.

The feeding roller pairs 12, 13 and 14 are driven in synchronization with one another by a driving force conveying mechanism 15 coupled to the driving motor 10. The driving force conveying mechanism 15 is comprised of a gear train disposed rotatably on one side wall portion 3*b* of the lower frame 2B. More specifically, the mechanism 15 is formed of the gear train having an output gear 10*a* fixed to an output shaft of the driving motor 10, input gears 12G, 13G and 14G which are sequentially engaged in the output gear 10*a* and mounted on the end portions of the driving shafts 12*a*, 13*a* and 14*a*, respectively and idle gears 16 installed between the gears.

According to the above-mentioned configuration, when the driving motor 10 is driven forward, each of the feeding roller pairs 12, 13 and 14 is driven to feed the bill in the insertion direction A, while when the driving motor 10 is driven reversely, being driven reversely to send the bill back to the bill insertion slot side.

Figure 5:
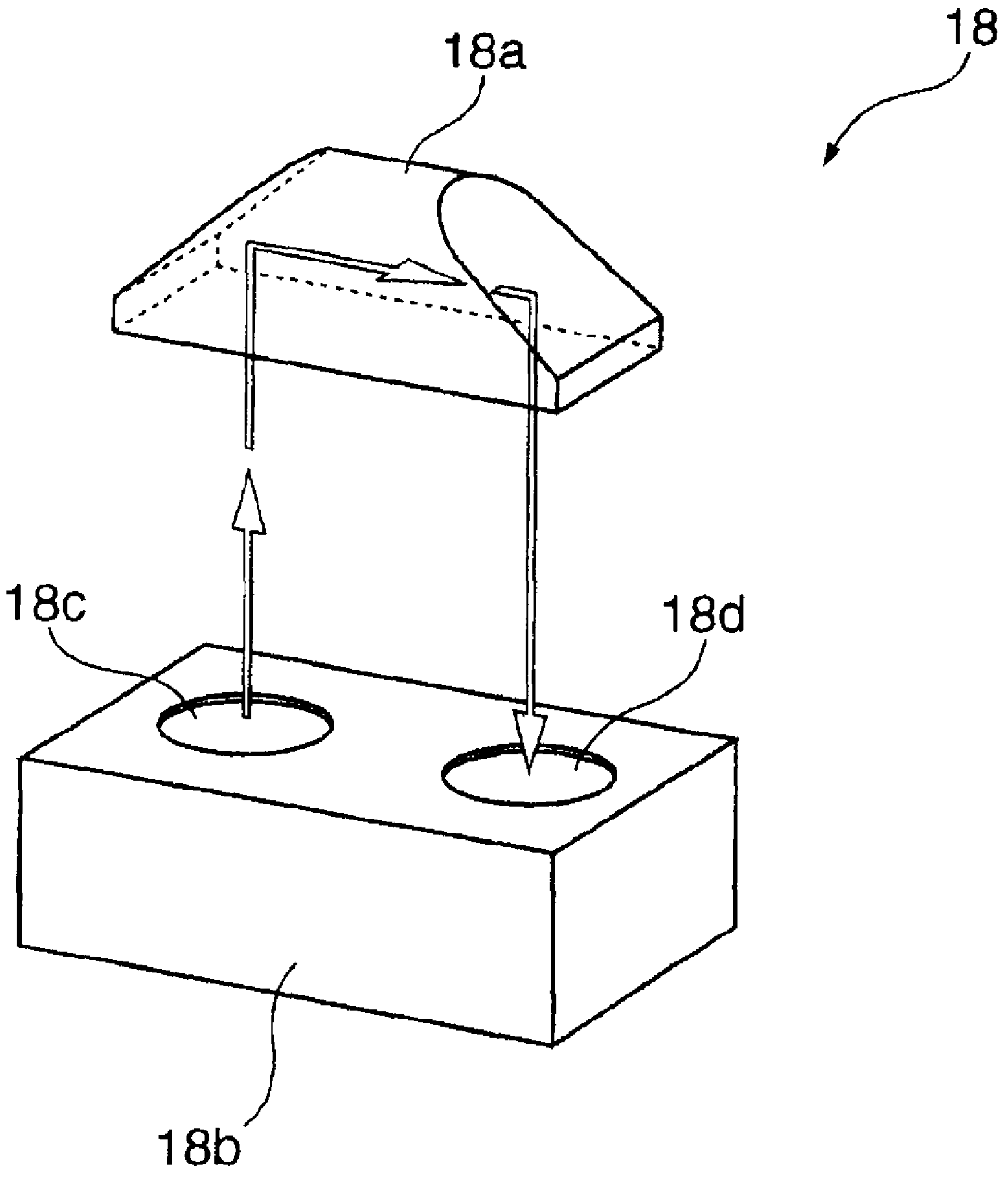
FIG. 5 is a perspective view showing a configuration of a bill detecting sensor.
Figure 6:
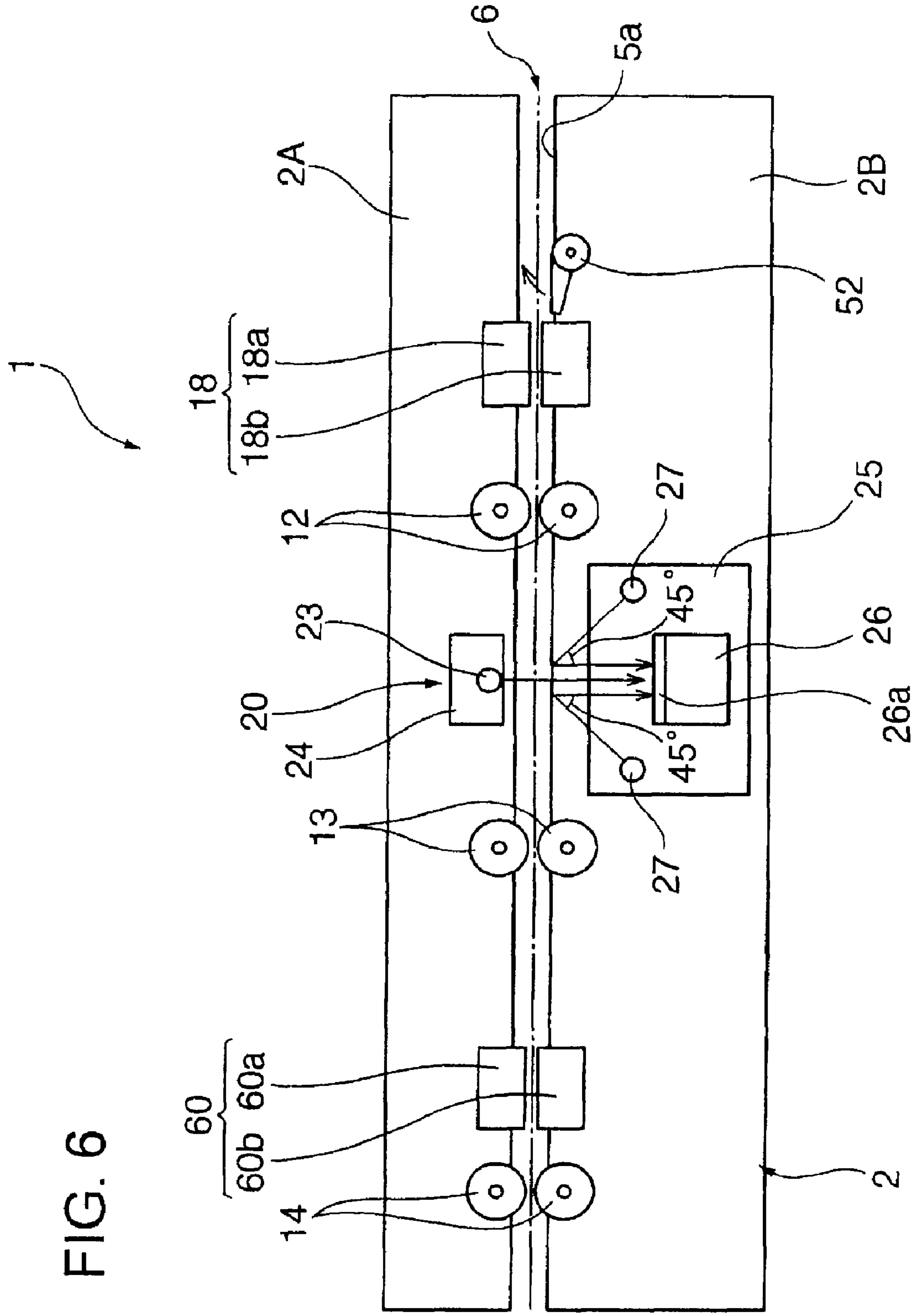
FIG. 6 is a view schematically showing the configuration of the bill identifying apparatus.

The bill detecting sensor 18 is to generate a detection signal in detecting a bill inserted in the bill insertion slot 6, and in this embodiment, is installed between rotating pieces constituting the shutter mechanism described later, and the bill reading means 20 for reading the bill. The bill detecting sensor 18 is comprised of, for example, an optical type sensor, more specifically, a regression reflective photosensor, and as shown in FIG. 5, formed of a prism 18*a* installed on the upper frame 2A side and a sensor body 18*b* installed on the lower frame 2B side. More specifically, the prism 18*a* and sensor body 18*b* are arranged in such a manner that light emitted from a light-emitting portion 18*c* of the sensor body 18*b* is detected by a light-receiving portion 18*d* of the sensor body 18*b* thorough the prism 18*a*. When a bill is passed through the bill feeding path 5 positioned between the prism 18*a* and sensor body 18*b* and the light is not detected in the light-receiving portion 18*d*, the sensor 18 generates a detection signal.

In addition, the bill detecting sensor 18 may be comprised of a mechanical type sensor, as well as the optical type sensor.

On the downstream side of the bill detecting sensor 18 is installed the bill reading means 20 for reading the bill information on the bill in a fed state. The bill reading means 20 is only required to have a configuration for irradiating the bill with the light to read the bill information when the bill is fed by the bill feeding mechanism 8, and generating a signal to enable the validity (authentication) of the bill to be judged, and in this embodiment, is configured to perform readout of the bill by applying the light from the opposite sides of the bill, and detecting the transmitted light and reflected light by a light-receiving device such as a photodiode or the like.

In this case, for the reflected light among the transmitted light and reflected light obtained from the bill, readout is performed on a pixel basis of a predetermined area as a unit by a line sensor having a light-receiving portion as described later, the image data of the bill comprised of a plurality of thus read pixels is stored in the storage means, and the stored image data is subjected to image processing to increase and/or decrease the number of pixels in the image processing section. Then, the image data with the number of pixels subjected to the increasing/decreasing processing is compared with the beforehand stored image data of the legitimate bill, and the authentication judgment processing is thereby executed.

In addition, for the transmitted light passed through the bill, the authentication judgment processing may be performed by the same technique as in the reflected light, or the authentication judgment processing may be performed using a different technique.

On the downstream side of the bill insertion slot 6 is disposed the shutter mechanism 50 that blocks the bill insertion slot 6. The shutter mechanism 50 is configured to be normally in a state for opening the bill insertion slot 6, closed when a bill is inserted and the bill detecting sensor 18 detects a rear end of the bill (the bill detecting sensor 18 is OFF), and thus prevent fraud and the like.

More specifically, the shutter mechanism 50 has the rotating pieces 52 that are rotatably driven to appear at predetermined intervals in the direction perpendicular to the bill feeding direction in the bill feeding path 5, and a solenoid (pull-type) 54 that is a driving source that rotatably drives the rotating pieces 52. In this case, the rotating pieces 52 are installed in two locations in the width direction of a spindle 55, and long holes 5*c* extending in the bill feeding direction are formed in the bill feeding face 3*a* of the lower frame 2B constituting the bill feeding path 5 to cause respective rotating pieces 52 to appear.

Further, on the downstream side of the bill reading means 20 is provided a bill passage detecting sensor 60 that detects passage of the bill. The bill passage detecting sensor 60 is to generate a detection signal when the bill judged as being valid is further fed to the downstream side, and the sensor 60 detects the rear end of the bill. Based on the occurrence f the detection signal, the energization of the solenoid 54 is released (the solenoid is OFF), and the driving shaft 54*a* moves in the protruding direction by the biasing force of the biasing spring provided in the driving shaft 54*a*. By this means, the rotating pieces 52 constituting the shutter mechanism are rotatably driven to open the bill feeding path via the spindle 55 synchronized with the driving shaft 54*a*.

The bill passage detecting sensor 60 is, as in the bill detecting sensor 18, comprised of an optical type sensor (regression reflective photosensor), and formed of a prism 60*a* installed on the upper frame 2A side and a sensor body 60*b* installed on the lower frame 2B side. Naturally, the bill passage detecting sensor 60 may be comprised of a mechanical type sensor, as well as the optical type sensor.

In the vicinity of the bill insertion slot 6 is provided an informing device that informs that the bill is being inserted in a visible manner. Such an informing device can be comprised of, for example, an LED 70 that blinks, is lit when a user inserts a bill in the bill insertion slot 6, and informs the user of the bill being handled. It is thereby possible to prevent the user from erroneously inserting a next bill.

Referring to FIGS. 2 to 4 and 6, described below is the configuration of the bill reading means 20 installed in the upper frame 2A and lower frame 2B.

The bill reading means 20 has a light-emitting unit 24 provided with a first light-emitting portion 23 that is disposed on the upper frame 2A side and that is capable of emitting slit-shaped light over the feeding path width direction on the upper side of the fed bill, and a line sensor 25 disposed on the lower frame 2B side.

The line sensor 25 installed on the lower frame 2B side has a light-receiving portion 26 disposed opposite to the first light-emitting portion 23 in a manner of sandwiching the bill, and second light-emitting portions 27 that are disposed adjacent to opposite sides of the light-receiving portion 26 in the bill feeding direction and that are capable of emitting slit-shaped light.

The first light-emitting portion 23 disposed opposite to the light-receiving portion 26 of the line sensor 25 functions as a light source for transmission. As shown in FIG. 2, the first light-emitting portion 23 is formed as the so-called light guide member made of a synthetic resin formed in the shape of a rectangle rod, and preferably, has functions of receiving emitted light from the light-emitting device 23*a* such as an LED and the like installed at the end portion, and emitting the light while guiding the light along the longitudinal direction. By this means, it is possible to apply the slit-shaped light uniformly to the entire region in the width direction of the feeding path of the fed bill with a simple configuration.

In addition, the light-receiving portion 26 of the line sensor 25 is disposed in the shape of a line in parallel with the first light-emitting portion 23 that is the light guide member, and formed in the shape of a thin plate which extends in the direction of intersecting the bill feeding path 5, and which is formed in the shape of a band having a width to the extent of not affecting the sensitivity of a light-receiving sensor, not shown, provided in the light-receiving portion 26. More specifically, the portion 26 has a configuration where a plurality of CCDs (Charge Coupled Device) is provided in the shape of a line in the center in the thickness direction of the light-receiving portion 26, and a Selfoc lens array 26*a* is arranged in the shape of a line in a position above the CCDs to gather the transmitted light and reflected light.

The second light-emitting portions 27 of the line sensor 25 function as light sources for reflection. As shown in FIG. 3, each of the second light-emitting portions 27 is formed, as in the first light-emitting portion 23, as the so-called light guide member made of a synthetic resin formed in the shape of a rectangle rod, and preferably, has functions of receiving emitted light from the light-emitting device 27*a* such as an LED and the like installed at the end portion, and emitting the light while guiding the light along the longitudinal direction. By this means, it is possible to apply the slit-shaped light uniformly to the entire region in the width direction of the feeding path of the fed bill with a simple configuration.

In addition, each of the second light-emitting portions 27 is capable of applying the light to the bill at an elevation angle of 45 degrees, and is disposed so that the reflected light from the bill is received in the light-receiving portion 26 (light-receiving sensor). In this case, the light emitted from the second light-emitting portion 27 is input to the light-receiving portion 26 at an angle of 45 degrees, but the incident angle is not limited to 45 degrees, and can be set as appropriate in ranges capable of reliably receiving the reflected light. Therefore, an arrangement of the second light-emitting portions 27 and second light-receiving portion 26 can be modified in design as appropriate corresponding to the configuration of the bill handling apparatus. Further, the second light-emitting portions 27 are installed on the opposite sides with the light-receiving portion 26 sandwiched therebetween to emit the light from the opposite sides respectively at an angle of 45 degrees. This is because when a tear, crease and the like are present on the bill surface and the light is applied to a concavo-convex portion caused by a portion of the tear, crease or the like from only one side, a shaded area may be caused in the concavo-convex portion by shielding the light. Therefore, by emitting the light from the opposite sides, it is possible to prevent the concavo-convex portion from being darkened, and to obtain image data with higher accuracy than in emission from one side. Naturally, the second light-emitting portion 27 may be configured to be installed on only one side.

The line sensor 25 is exposed to the bill feeding path 5, and is thereby provided with concavo-convex portions 25*a*, as shown in FIG. 2, on opposite ends of its surface portion (that is substantially the same plane as the feeding face 3*a*) in the bill feeding direction to catch the fed bill hardly. Further, as in the line sensor 25, the light emitting unit 24 is provided with concavo-convex portions 24*a*, as shown in FIG. 2, on opposite ends of its surface portion in the bill feeding direction to catch the fed bill hardly.

The bill authentication judgment method will specifically be described below which is executed in the bill identifying means for identifying the authentication of a bill based on the bill information read by the bill reading means 20. In addition, as mentioned above, described herein is the authentication judgment processing using the reflected light.

Figure 7:
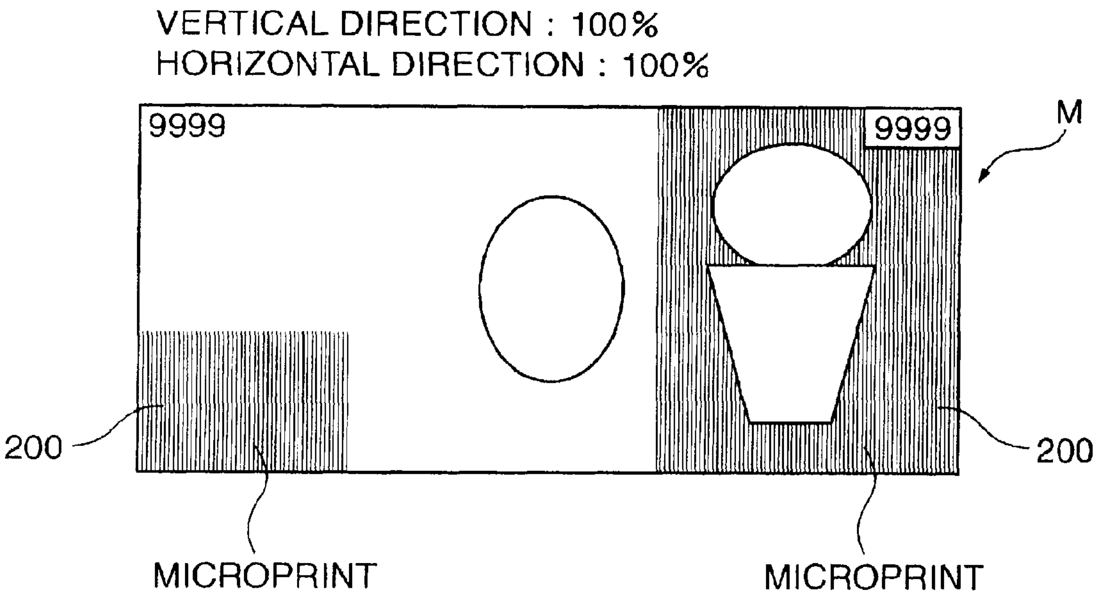
FIG. 7 is a view showing a schematic configuration of a bill.

Generally, as one means for preventing forgery, a microprint (extremely fine characters, pattern and the like making reproduction hard) is formed in a bill. As schematically shown in FIG. 7, the microfilm is configured by forming a large number of fine lines 200 in a unit width, and for example, is capable of being formed by intaglio engraving. The configuration of the microprint is not described in detail, but as easily understood in the figure, the microprint is configured by rendering a large number of linear fine lines in a unit width. Naturally, as well as the linear shape as shown in the figure, the microprint may be in the form of a curve or in a combination of the straight line and curve. Further, using these fine lines, characters and/or pattern may be configured.

In the bill authentication judgment technique according to this embodiment, first, with the bill M fed by the bill feeding mechanism 8, the second light-emitting portions 27 in the line sensor 25 emit the light to the bill, and the light-receiving portion 26 receives the reflected light and executes readout of the bill. The readout is executed on a pixel basis of a predetermined area as a unit during the feeding processing of the bill, and thus read image data of the bill comprised of a large number of pixels (a plurality of pixels) is stored in the storage means such as RAM and the like. Then, the image data comprised of a plurality of pixels stored herein is subjected to the image processing to increase and/or decrease the number of pixels in an image processing section.

The image data of the bill subjected to the image processing for increasing and/or decreasing the number of pixels as described above enables acquisition of the moire data representing a fringe-shaped pattern (moire fringes) specific to the bill in the above-mentioned microprint portion. The moire data specific to the scaling ratio is obtained by scaling up or down the number of pixels, and by comparing this data with the beforehand stored moire data of the legitimate bill, it is possible to make the authentication judgment.

Figure 8:
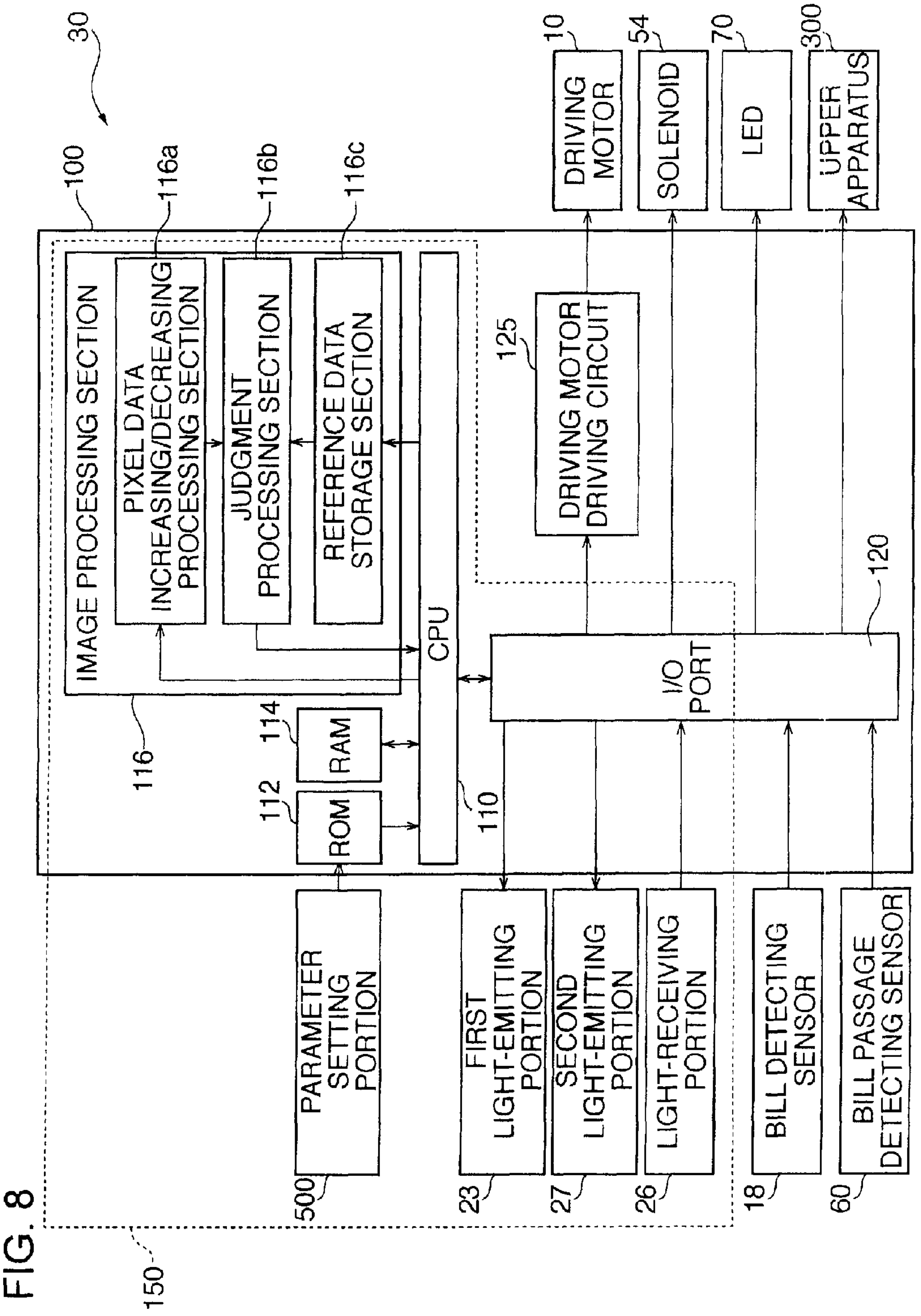
FIG. 8 is a block diagram illustrating a control system of the bill identifying apparatus.

FIG. 8 is a block diagram illustrating a schematic configuration of the control means for controlling the bill identifying apparatus 1 provided with the bill feeding mechanism 8, bill reading means 20, shutter mechanism 50, an authentication judgment section 150 that executes the authentication judgment processing of a bill and the like.

The control means 30 is provided with a control board 100 for controlling the operation of each driving apparatus as described above. On the control board 100 are mounted a CPU (Central Processing Unit) 110 constituting the bill identifying means (a card identifying section), ROM (Read Only Memory) 112, RAM (Random Access Memory) (a storage section) 114 and image processing section 116.

The ROM 112 stores permanently data such as operation programs for driving apparatuses such as the driving motor 10, solenoid 54, LED 70 and the like, various kinds of programs such as an authentication judgment program and the like, a conversion table comprised of data to determine whether or not to magnify or thin the image data (whether to scale the image data at a higher, same or lower magnification) executed in a pixel data increasing/decreasing processing section 116*a* in the image processing section 116, and the like.

The CPU 110 operates according to the programs stored in the ROM 112, inputs and outputs signals to/from the driving apparatuses as described above via an I/O port 120, and controls the entire operation of the bill identifying apparatus. In other words, the CPU 110 is connected to a driving motor driving circuit 125 (driving motor 10), solenoid 54, and LED 70 via the I/O port 120. The driving apparatuses are controlled in operation by control signals from the CPU 110 according to the operation programs stored in the ROM 112. Further, the CPU 110 receives detection signals from the bill detecting sensor 18, and the bill passage detecting sensor 60 via the I/O port 120, and based on these detection signals, controls driving of the driving motor 10, blinking of the LED 70, and driving of the solenoid 54.

The RAM 114 has functions of temporarily storing the data and programs used for the CPU 110 to operate, while acquiring the received light data (image data of a bill comprised of a plurality of pixels) of a bill targeted for judgment to temporarily store.

The image processing section 116 is provided with the pixel data increasing/decreasing processing section (a increasing/decreasing section) 116*a* that performs the increasing/decreasing processing of the pixels of the bill image data stored in the RAM 114, a reference data storage section 116*b* that stores the reference data on bills, and a judgment processing section 116*c* which compares the image data subjected to the increasing/decreasing processing of the pixels in the pixel data increasing/decreasing processing section 116*a* with the reference data stored in the reference data storage section 116*b*, and performs the judgment processing on the bill. In this case, in this embodiment, the reference data is stored in the dedicated reference data storage section 116*b*, but may be stored in the ROM 112. In other words, the legitimate bill data may be stored in association with the conversion table to specify a scaling ratio of the image data. Further, although the reference data of the legitimate bill may be stored beforehand in the reference data storage section 116*b*, for example, the legitimate bill is fed through the bill feeding mechanism 8 to acquire the received light data, and the data may be stored as the reference data.

Further, the CPU 110 is connected to the first light-emitting portion (light guide member) 23 in the light-emitting unit 24, and the light-receiving portion 26 and second light-emitting portions (light guide members) 27 in the line sensor 25 via the I/O port 120. These portions constitute a bill authentication judgment section 150 together with the CPU 110, ROM 112, RAM 114 and image data processing section 116, and control the operations required for the authentication judgment in the bill identifying apparatus 1. In addition, in this embodiment, the authentication judgment section 150 is shared as the control section for controlling the driving system of the bill, but the function of performing the authentication judgment processing may be configured by dedicated hardware.

Furthermore, the CPU 110 is connected to a control section of the game media lending apparatus into which the bill identifying apparatus 1 is incorporated, and an upper apparatus 300 such as a host computer and the like of an external apparatus, via the I/O port 120, and transmits various kinds of signals (such as information of the bill, alarm signal and the like) to the upper apparatus.

Described herein is an example of procedures for increasing/decreasing the pixels of the image data in the pixel data increasing/decreasing processing section 116*a* with reference to the conceptual diagram in FIG. 9.

FIG. 9(*a*) schematically shows original data on a pixel basis of the image data of the bill first read by the reading means 20 (the reduced number of pixels is shown with the vertical direction:horizontal direction=1:1). A square corresponds to a pixel, and a number described within each square shows brightness of a color in the pixel of the read bill. Actually, in each pixel, brightness of each of R, G and B is controlled by filter control of R, G and B, and each pixel thereby includes color information different from one another (in FIG. 9(*a*), all the pixels are comprised of the color information of different brightness.)

The original data of the bill thus read by the bill reading means 20 is stored in the RAM 114 as the storage means, and then, subjected to the increasing/decreasing processing of the pixel data in the pixel data increasing/decreasing processing section 116*a*. For example, when the number of pixels is increased so that the vertical direction is not changed and that the horizontal direction is of two times(vertical direction: horizontal direction=1:2), first, as shown in FIG. 9(*b*), one pixel is added for each pixel in the horizontal direction, and then, as shown in FIG. 9(*c*), the same color information as the color information of a pixel to the side of the added pixel is assigned to the added pixel portion. By this means, it is possible to generate the image data processed at the same magnification in the horizontal direction with the vertical direction kept. In addition, when the same-magnification processing is not performed, for example, a conversion table may be prepared to beforehand determine positions of pixels on which the color information assignment processing is executed, and the like.

Meanwhile, for example, when the number of pixels is decreased so that the vertical direction is not changed and that the horizontal direction is of 0.25 time (vertical direction: horizontal direction=1:0.25), for example, as shown in FIG. 9(*d*), the reduction processing may be performed by a method of dividing all the pixels in the horizontal direction every four pixels, and thinning pixels therebetween (pixels shown by blank) (FIG. 9(*e*) ) By this means, it is possible to generate the image data reduced to ¼ in the horizontal direction with the vertical direction kept.

Figure 10A:
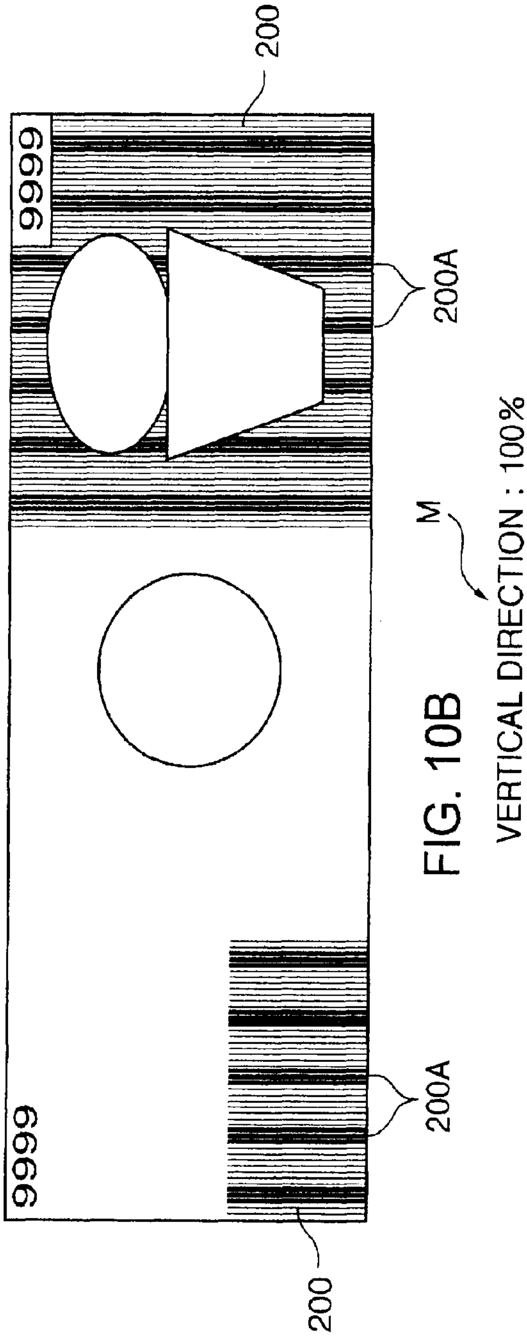
FIGS. 10A and 10B are views showing image data of the bill obtained subsequent to the increasing/decreasing processing of the number of pixels.
Figure 10B:
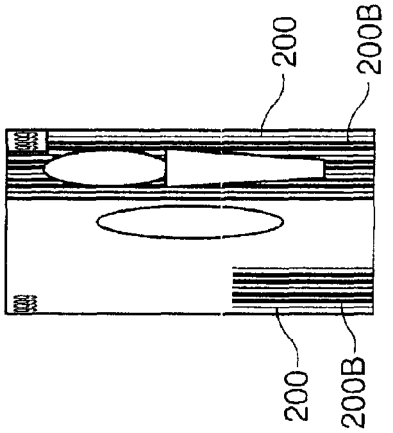

FIG. 10 shows the image data of the bill obtained after performing the decreasing/increasing processing of the number of pixels as described above. As shown in FIG. 10(*a*), when the number of pixels is increased so that (vertical direction:horizontal direction=1:2), in the microprint portion (portion of a large number of fine lines 200) formed on the bill M as shown in FIG. 7, obtained is the moire data (moire fringes) 200A specific to the increasing ratio. Meanwhile, as shown in FIG. 10(*b*), when the number of pixels is decreased so that (vertical direction:horizontal direction=1:0.25), in the microprint portion (portion of a large number of fine lines 200) formed on the bill M as shown in FIG. 7, obtained is the moire data (moire fringes) 200B specific to the decreasing ratio.

Herein, the principles of occurrence and occurrence conditions of the moire fringes are described with reference to FIGS. 11 to 13.

Figure 11:
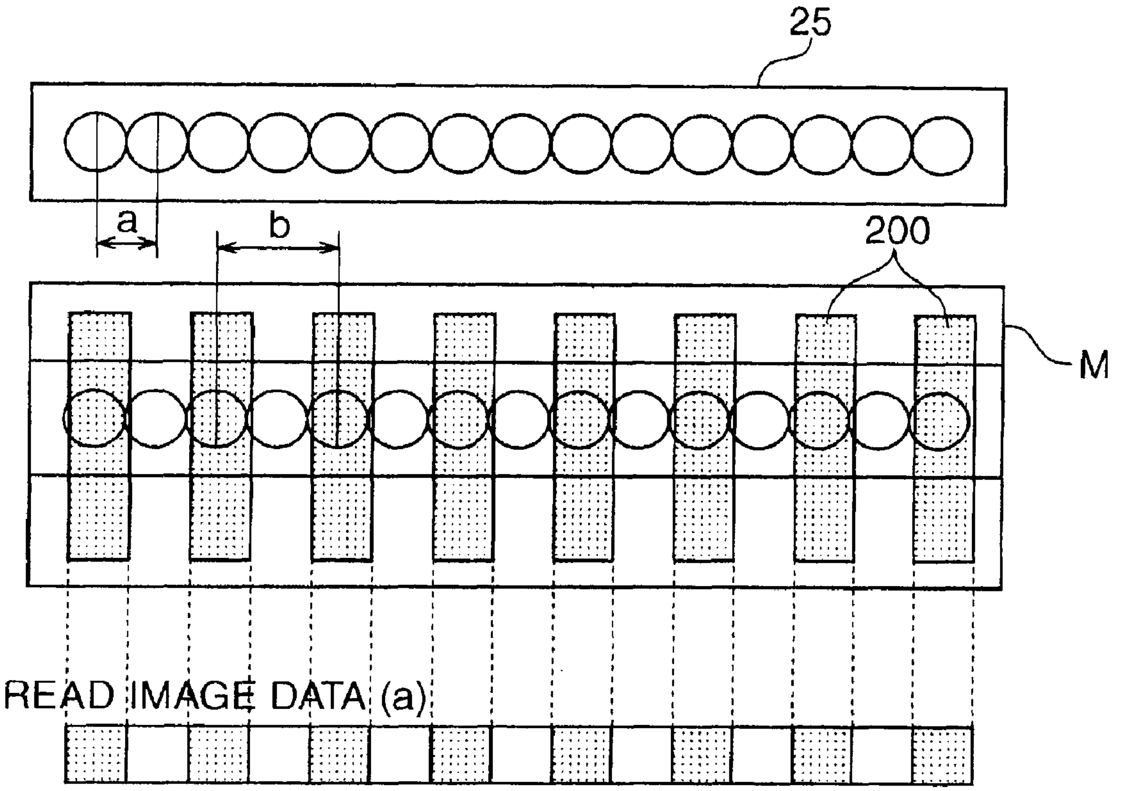
FIG. 11 is a schematic view illustrating the principles of occurrence of moire fringes to explain conditions where the moire fringes do not occur.

As shown in FIG. 11, when an interval of the fine lines (shown by adjacent black bars) formed in the bill M is b, and the interval b is wider than an interval d for the line sensor 25 constituting the bill reading means 20 to read a pixel (b>d), since the fine lines 200 of the bill can be read accurately, the read image data (a) is a state where the fine lines of the bill are reproduced without change, and moire fringes do not occur.

Figure 12:
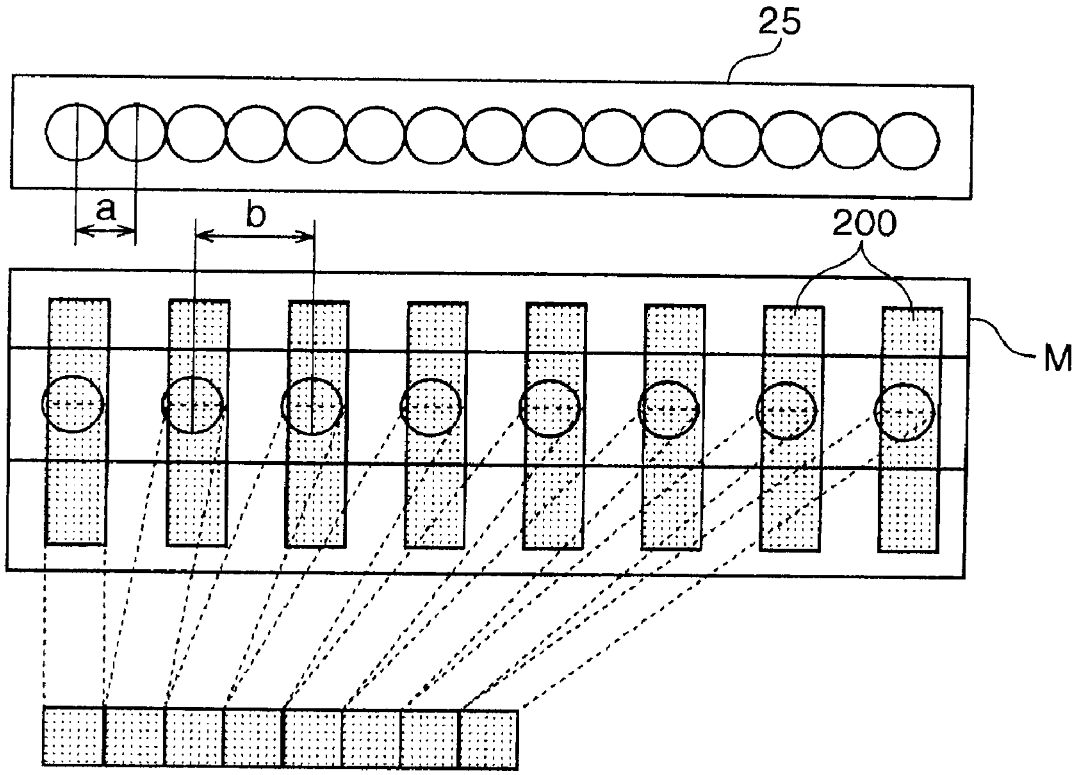
FIG. 12 is another schematic view illustrating the principles of occurrence of moire fringes to explain conditions where the moire fringes occur.

In contrast thereto, as shown in FIG. 12, the interval b between fine lines 200 formed in the bill M is the same as the interval d for the line sensor 25 to read a single pixel or less than the interval d (b≦d), the black bars that are the fine lines cannot be reproduced as the image data (a) as shown in FIG. 11, and the read image data is read as an entire black state. In other words, when b≦d, it is not possible to read the fine lines 200 of the bill accurately, and the fine lines become coarse, thereby resulting in a cause of generating moire fringes.

Figure 13:
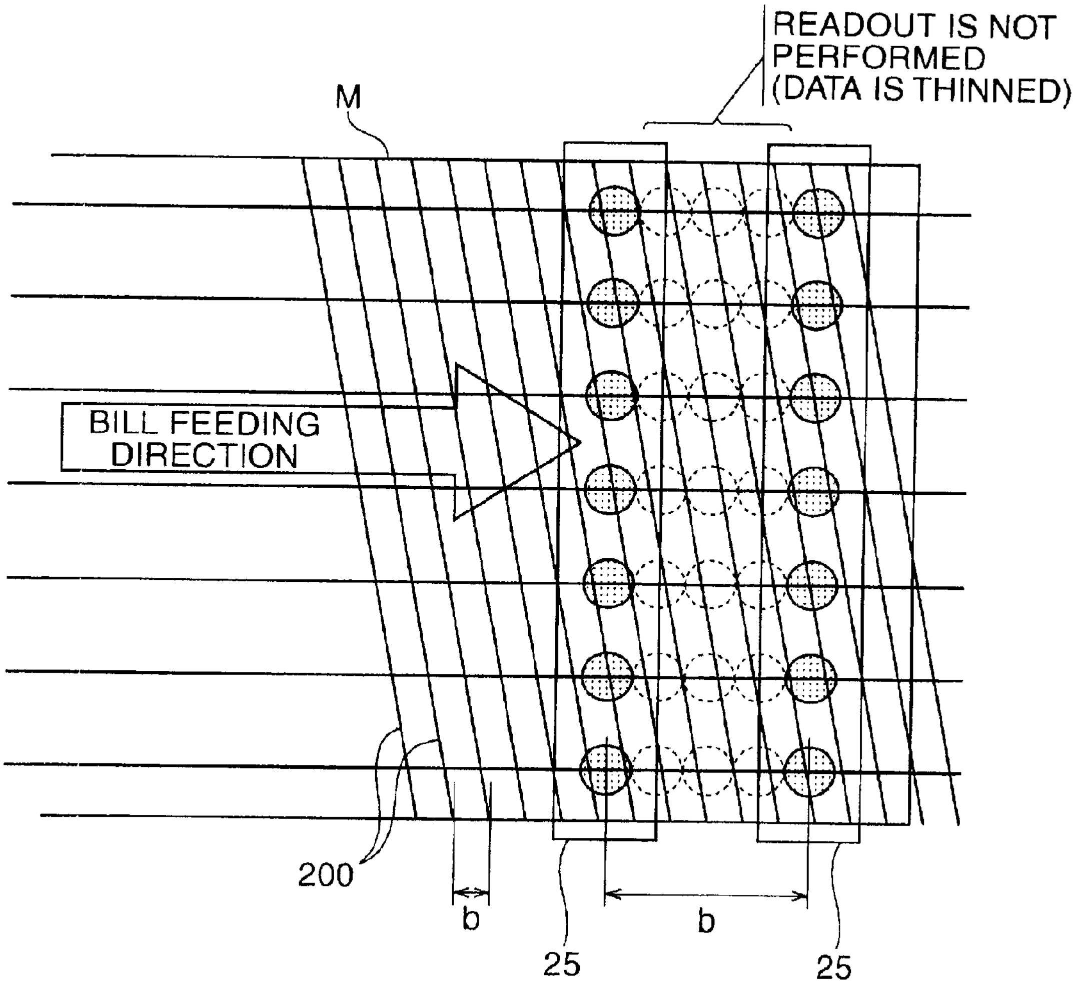
FIG. 13 is a view schematically illustrating conditions where moire fringes occur in performing the processing for thinning the number of pixels when the bill is read.

As described above, in the case of performing the decreasing processing of the number of pixels, for example, as shown in FIG. 13, when the interval b of original fine lines of the bill is less than or equal to the interval d between pixels obtained by thinning the image data (the decreasing ratio of the number of pixels meets the condition of b≦d), it is difficult to clearly distinguish between adjacent fine lines (the line of read fine-line data is coarse), and the moire fringes occur by lines in the coarse state.

Figure 14:
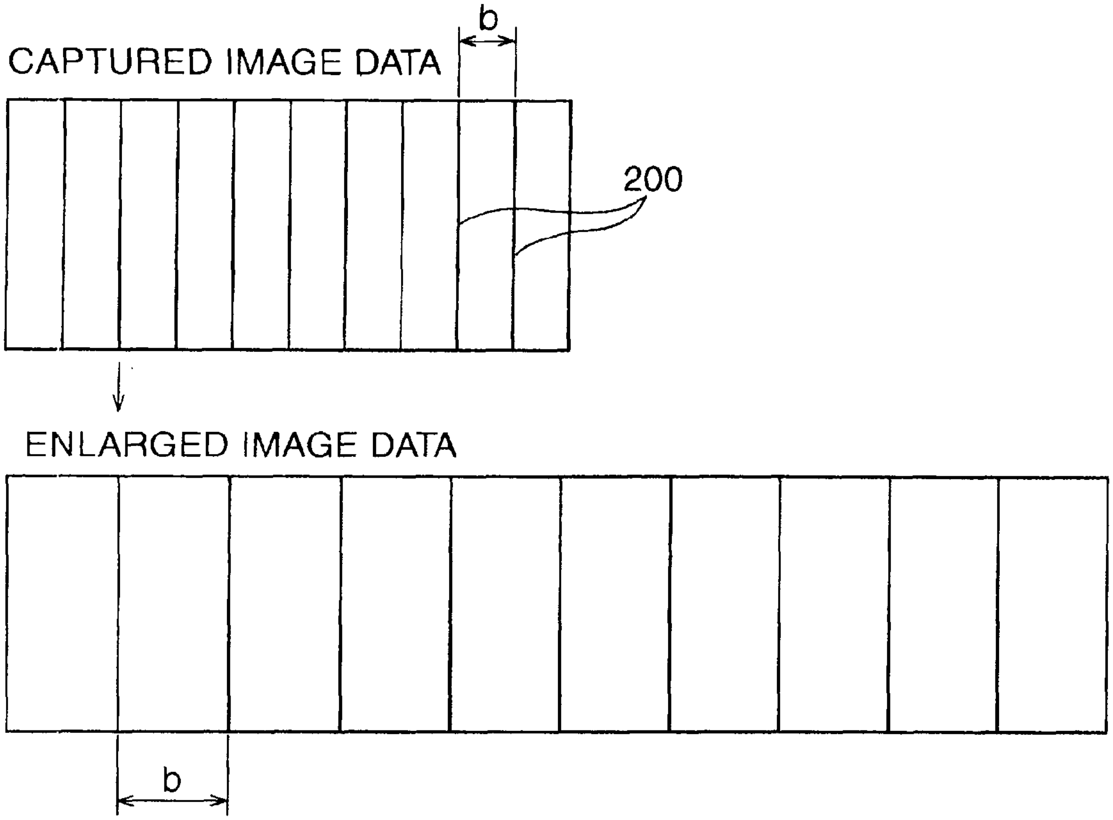
FIG. 14 is a view schematically illustrating conditions where moire fringes occur in performing the processing for increasing the number of pixels when the bill is read.

Meanwhile, as shown in FIG. 14, with the interval of fine lines 200 of the captured image data being b, when performing the processing for increasing the number of pixels, the interval of fine lines 200 obtained from the enlarged image data is b' by the enlarging processing. When the interval b' obtained from the enlarged image data is less than or equal to the interval d to read one pixel (the increasing ratio meets the condition of b'≦d), as in the above-mentioned principles, the moire fringes occur.

As described above, the number of pixels of the image data on the captured bill is increased and/or decreased with different ratios in the bill capturing direction and the direction perpendicular thereto, and it is thereby possible to generate moire fringes in the image data, and to acquire the moire data with ease.

As a result, by the judgment processing section 116*c* comparing with the reference data (moire-fringe data stored corresponding to scaling ratios) beforehand stored in the reference data storage section 116*b*, it is possible to perform the authentication judgment processing of the bill. More specifically, for example, for each pixel in the portion where the moire fringes occur, the pixel data on the brightness (concentration) is detected, and compared with the reference data, and when the difference is a predetermined value or less, the pixel portion is regarded as being equal. This processing is executed for all the pixels in the portion where moire fringes occur, and it is thereby possible to make an authentication judgment.

Figure 15:
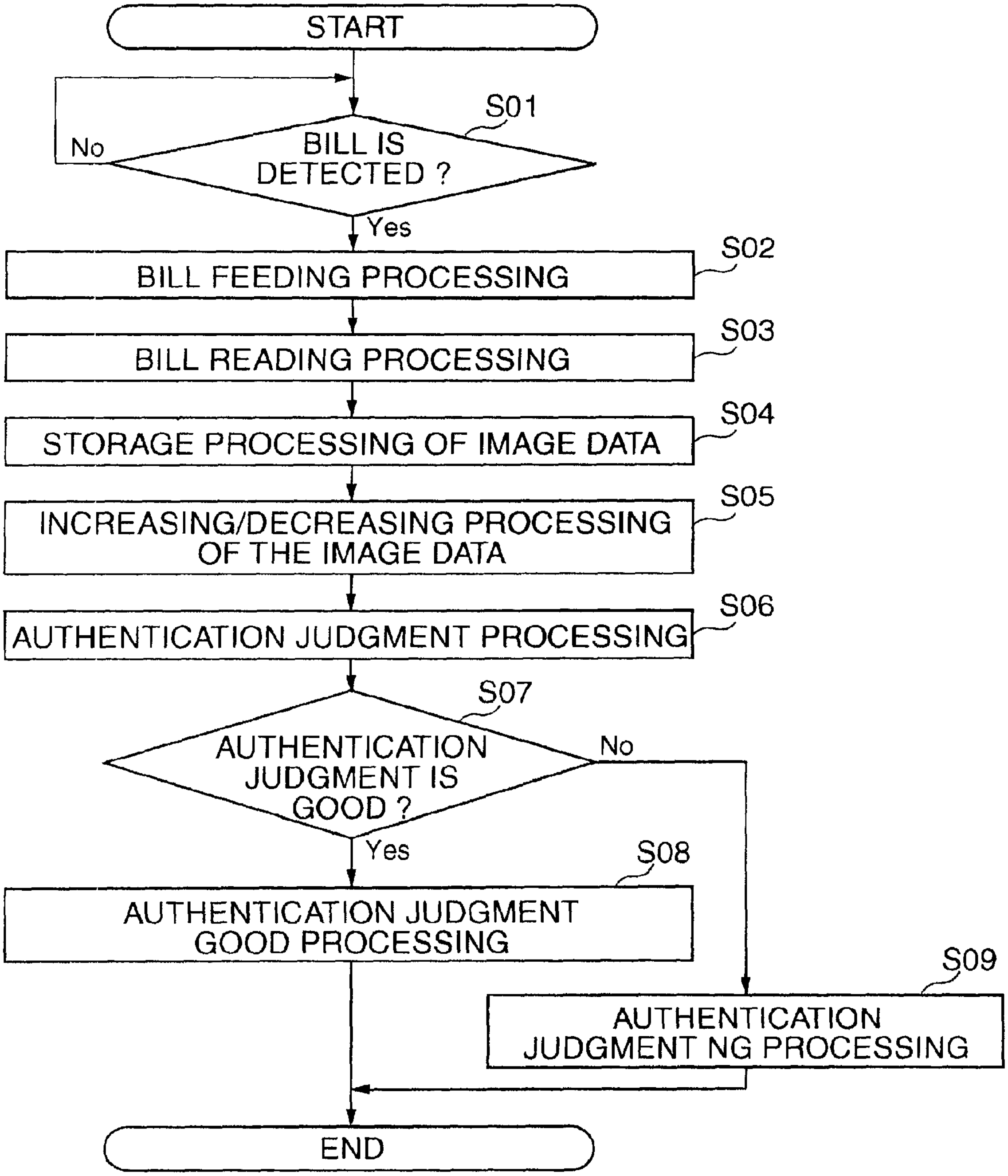
FIG. 15 is a flowchart illustrating an example of procedures of the operation processing in the bill identifying apparatus and authentication judgment processing using the moire data as described above.

FIG. 15 is a flowchart illustrating an example of procedures of the operation processing in the bill identifying apparatus and the authentication judgment processing using the moire data as described above. Hereinafter, the processing operation of the bill identifying apparatus according to this embodiment will be described with reference to the flowchart.

First, the CPU 110 of the bill identifying apparatus 1 determines whether or not a bill is detected (step S01). This is determined by whether the bill detecting sensor 18 detects insertion of the bill and transmits a detection signal. When the bill detecting sensor 18 detects the bill, the driving motor 10 is driven, and the feeding processing of the bill is performed via the bill feeding mechanism 8 (step S02). In addition, at this point, the LED 70 undergoes the lighting processing, and notifies the user of the bill being handled to prevent an additional bill from being inserted.

In synchronization with the feeding processing of the bill, the bill reading means 20 executes the reading processing of the bill (step S03). In the reading processing of the bill, the CPU 110 outputs irradiation signals to the first and second light-emitting portions 23 and 27, each of the light-emitting portions 23 and 27 applies the irradiation light to the bill, and the light-receiving portion 26 receives the reflected light. In addition, the moire data used in the identifying processing of the bill is acquired based on the reflected light of the light applied from the light-emitting portions 27 as described previously.

By the bill being fed inside the apparatus, the bill reading means 20 reads the information, and the control means 30 executes the authentication judgment processing. In the readout of the bill, the light-receiving portion 26 of the line sensor 25 receives the reflected light from the bill in a fed state to which the light is applied from the second light-emitting portions 27. At the time of this readout, as described above, the image information of the bill is acquired for each pixel of a predetermined area as a unit. Further, the transmitted light that is applied from the first light-emitting portion 23 and that transmits the bill can be used in another authentication judgment processing (authentication judgment processing by gray-scale data and the like).

In addition, during the execution of the authentication judgment processing, when the bill detecting sensor 18 detects a rear end of the bill in the fed state (the bill detecting sensor 18 is OFF), the solenoid 54 is energized, and the rotating pieces 52 are thereby driven to rotate and block the bill insertion slot 6 to prevent additional insertion of a bill.

As described above, the bill information read on a pixel basis constitutes the image data of the entire bill by a plurality of pixels, and the image data is stored in the RAM 114 that is the storage means (step S04). Then, the image data stored in the RAM 114 is subsequently subjected to the image processing to increase and/or decrease the number of pixels in the image processing section 116 (step S05). In addition, the processing for increasing/decreasing the number of pixels is executed based on the conversion table stored in the ROM 112, and the image data of the bill obtained by this processing obtains the specific moire data in the microprint portion corresponding to the increasing/decreasing ratio as described above.

Then, the authentication judgment processing of the bill is subsequently performed in step S06. As described above, since the specific moire data (moire fringes) is obtained by the increasing/decreasing ratio by the conversion table stored in the ROM, the moire data is compared with the reference data (moire-fringe data stored in association with the scaling up/down ratio) beforehand stored in the reference data storage section 116*b*, and the authentication of the bill is thereby judged.

In the aforementioned authentication judgment processing, when the fed bill is judged to be a legitimate bill (Yes in step S07), the bill judgment good processing is executed (step S08). This processing corresponds to, for example, the processing for feeding the bill toward a stacker on the downstream side without change, the processing for halting the driving of the driving motor 10 in the stage where the rear end of the bill further fed to the downstream side is detected by the bill passage detecting sensor 60, the processing for turning OFF the driving of the solenoid 54 (energization is canceled) to withdraw the rotating pieces 52 from the bill feeding path 5 with the halt of the driving motor 10, and opening the bill insertion opening 6, while extinguishing the LED 70, and the like.

Meanwhile, when the fed bill is judged to be a bogus bill (including the case that the bill is seriously worn and the like) in the processing of step S07 as described above, the bill judgment NG processing is executed (step S09). This processing corresponds to, for example, the reverse-rotation processing of the driving motor 10 to return the inserted bill, the processing for outputting an alarm signal to the upper apparatus 300, and the like.

According to the bill identifying apparatus 1 configured as described above, by increasing/decreasing the number of pixels of the image data on the captured bill, it is possible to acquire the moire data showing a fringe-shaped pattern (moire fringes) specific to the bill. By this means, for example, even in the case of changing the sensor constituting the bill reading means 20 to another sensor with a high resolution to enhance the identification accuracy, the need is eliminated of newly manufacturing a filter and the like to generate the moire fringes, and it is possible to suppress increases in the cost.

Moreover, according such a configuration, the moire fringes are apt to occur in the image data only by making an increase/decrease in the number of pixels of the image data of the captured bill by increasing/decreasing with different ratios respectively in the bill capturing direction and in the direction perpendicular thereto, and it is possible to acquire the moire data with ease.

Further, in the above-mentioned configuration, an increase/decrease in the number of pixels in the pixel data increasing/decreasing processing section 116*a* is set by a parameter setting section 500 (see FIG. 8) based on the conversion table stored in the ROM 112 so that the increase/decrease is executed in predetermined increasing/decreasing ratios in the bill capturing direction and the direction perpendicular thereto. Accordingly, simply by varying parameters (vertical direction; 50%, horizontal direction; 50% and the like), it is possible to acquire the optimal moire data corresponding to the resolution of the sensor. Therefore, it is only required to reserve parameters to scale up/down the image data in the ROM storage area, while eliminating the need of reserving an unnecessary storage area, and it is thereby possible to suppress increases in the cost.

In the foregoing, the embodiment of the present invention is described, the invention only requires the configuration where in reading the fed bill, the moire data is acquired by increasing and/or decreasing the number of read pixels of the read image data, and based on the image data of the bill having the moire data, the authentication of the bill is identified, and the other configuration is capable of being modified as appropriate. For example, the configuration and arrangement form of the reading means (sensor) for reading the bill is not limited to the above-mentioned embodiment, and is capable of being modified in various manners.

The bill identifying apparatus of the invention is capable of being incorporated into various kinds of apparatuses that provide products and/or service by inserting a bill, without being limited to a game media lending apparatus. Further, this embodiment describes the apparatus for handling bills as an example of the card identifying apparatus of the invention, but the invention is applicable to apparatuses for making an authentication judgment on gold certificates, securities and the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A card identifying apparatus, comprising:

a reading section that reads a card on a pixel basis of a predetermined area as a unit including color information having a brightness;

a storage section that stores image data including a plurality of pixels read by the reading section;

an increasing/decreasing section that acquires moire data specific to increasing or decreasing ratios, for the image data stored in the storage section, by increasing/decreasing a number of the pixels of the image data according to the increased or decreased ratios; and a card identifying section that identifies authentication of the card based on the moire data of the image data acquired by increasing/decreasing the number of pixels by the increasing/decreasing section, wherein the increasing/decreasing section increases/decreases the number of pixels with different ratios respectively in a card capturing direction and in a direction perpendicular to the card capturing direction such that the ratios in the two directions are different from each other by at least a factor of two.

2. The card identifying apparatus according to claim 1, further comprising:

a parameter setting section that sets increasing/decreasing ratios so that the increasing/decreasing section increases/decreases the number of pixels with predetermined increasing/decreasing ratios respectively in the card capturing direction and in a direction perpendicular to the card capturing direction.

3. The card identifying apparatus according to claim 1, further comprising:

a reference data storage section that stores the reference data on the card, wherein the card identifying section identifies authentication of the card by comparing the image data subjected to the increasing/decreasing processing of the pixels in the increasing/decreasing section with the reference data stored in the reference data storage section.

4. The card identifying apparatus according to claim 1, wherein the card identifying section detects the pixel data on the brightness for each pixel in the pixel portion where the moire data occur, compares said pixel data with the reference data, and when the difference is a predetermined value or less, regards the pixel portion as true.

5. The card identifying apparatus according to claim 1, further comprising:

a card feeding mechanism that feeds the card, wherein the reading section has a line sensor that reads the card fed by the card feeding mechanism over the feeding width direction of the card perpendicular to the card capturing direction.

6. The card identifying apparatus according to claim 1, wherein the card is a bill.

7. A card identifying apparatus, comprising:

a reading means for reading a card on a pixel basis of a predetermined area as a unit including color information having a brightness;

a storage means for storing image data including a plurality of pixels read by the reading section;

an increasing/decreasing means for acquiring moire data specific to increasing or decreasing ratios, for the image data stored in the storage means, by increasing/decreasing a number of the pixels of the image data according to the increased or decreased ratios; and a card identifying means for identifying authentication of the card based on the moire data of the image data acquired by increasing/decreasing the number of pixels by the increasing/decreasing means, wherein the increasing/decreasing means increases/decreases the number of pixels with different ratios respectively in a card capturing direction and in a direction perpendicular to the card capturing direction such that the ratios in the two directions are different from each other by at least a factor of two.

* * * * *